United States Patent [19]

Inoue

[11] Patent Number: 4,485,726
[45] Date of Patent: Dec. 4, 1984

[54] ASSISTOR FOR TRANSMISSION
[75] Inventor: Yoshio Inoue, Ranzan, Japan
[73] Assignee: Jidosha Kiki Co., Ltd., Japan
[21] Appl. No.: 379,321
[22] Filed: May 18, 1982

Related U.S. Application Data

[63] Continuation of Ser. No. 141,212, Apr. 17, 1980, abandoned.

[30] Foreign Application Priority Data

May 10, 1979 [JP] Japan .................................. 54-57437

[51] Int. Cl.³ .............................................. F15B 9/10
[52] U.S. Cl. ................................ 91/375 R; 91/376 A; 74/388 R; 74/473 R
[58] Field of Search .......................... 91/376 A, 375 R; 74/388 R, 473 R

[56] References Cited

U.S. PATENT DOCUMENTS

| | | | |
|---|---|---|---|
| 2,708,353 | 5/1955 | Brady | 91/376 A |
| 3,138,069 | 6/1964 | Bishop | 91/375 A |
| 3,773,081 | 11/1973 | Venable et al. | 91/375 A |
| 3,858,484 | 1/1975 | Saida et al. | 91/376 A |
| 3,939,756 | 2/1976 | Saida et al. | 91/376 A |
| 4,177,713 | 12/1979 | Lewis et al. | 91/376 A |
| 4,216,701 | 8/1980 | Komoriya | 91/376 A |

FOREIGN PATENT DOCUMENTS

| | | | |
|---|---|---|---|
| 548042 | 4/1932 | Fed. Rep. of Germany | 91/375 R |
| 419322 | 8/1974 | U.S.S.R. | 91/375 R |

Primary Examiner—Paul E. Maslousky
Attorney, Agent, or Firm—McGlew and Tuttle

[57] ABSTRACT

An assistor for operating a transmission, to be installed between the gearshift lever and the shift lever for actuating the shift jaws of the transmission, comprises a semicylindrical cylinder, a vane type piston adapted to turn slidingly within the cylinder, and a directional control valve for supplying a fluid to chambers defined by the vane of the piston. Operation of the gearshift lever opens the directional control valve to supply the fluid to one of the chambers separated by the piston vane, whereby the piston is turned and its turning output is transmitted from its boss to the shift lever.

1 Claim, 14 Drawing Figures

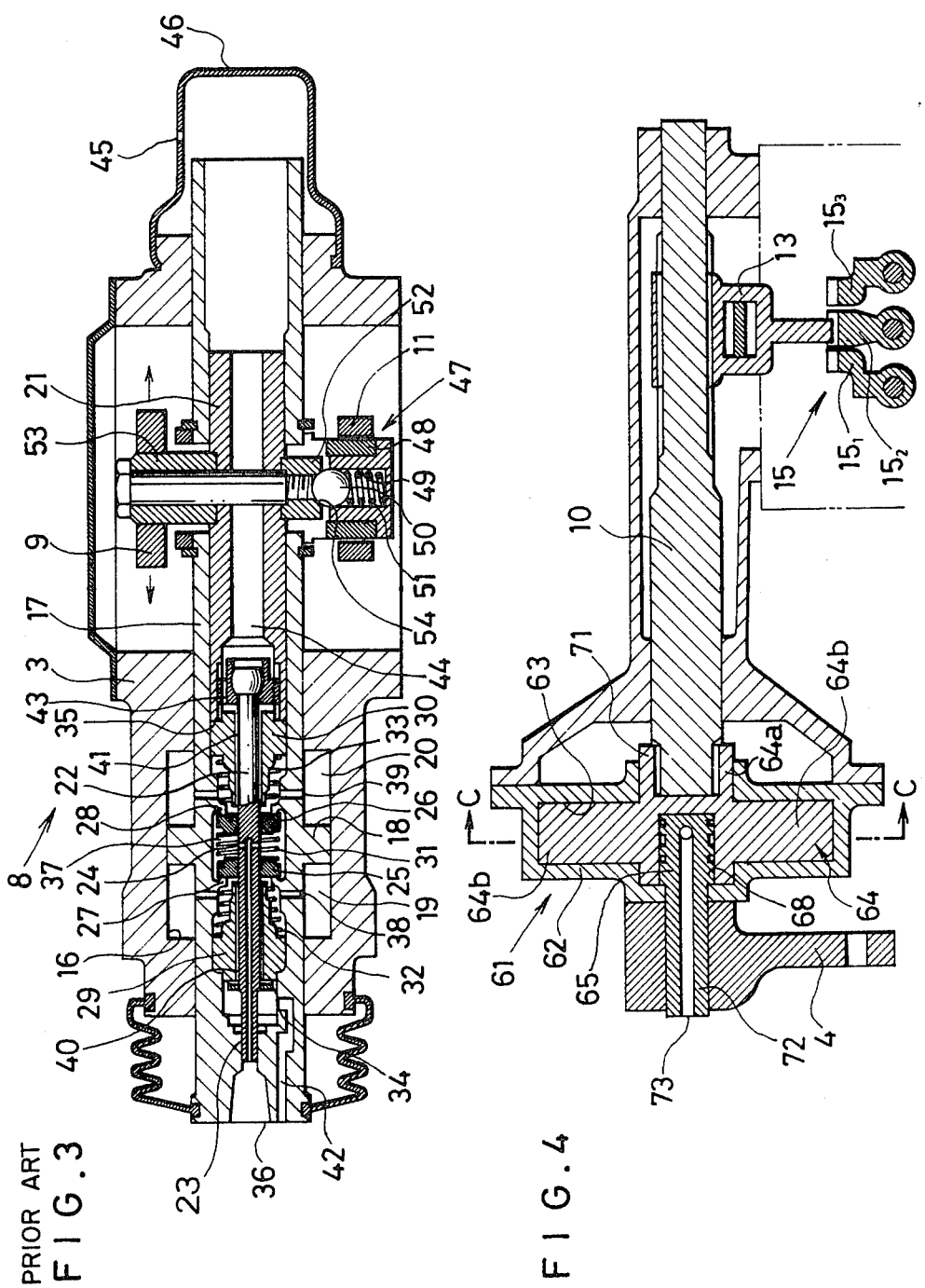

FIG.9
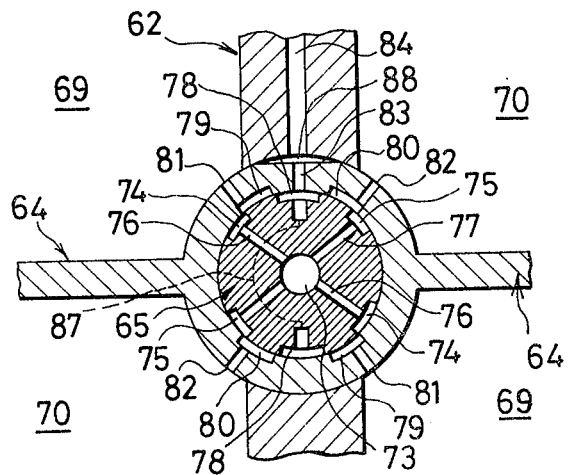
(I)
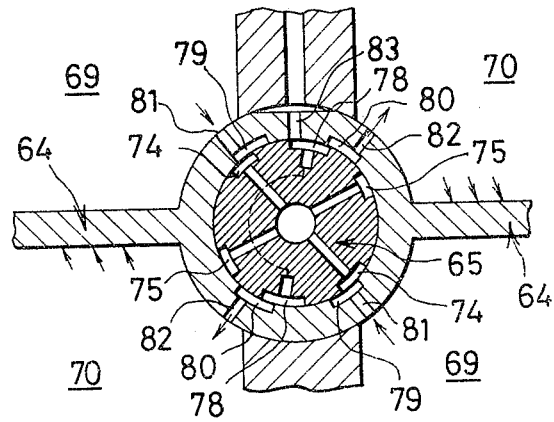
(II)
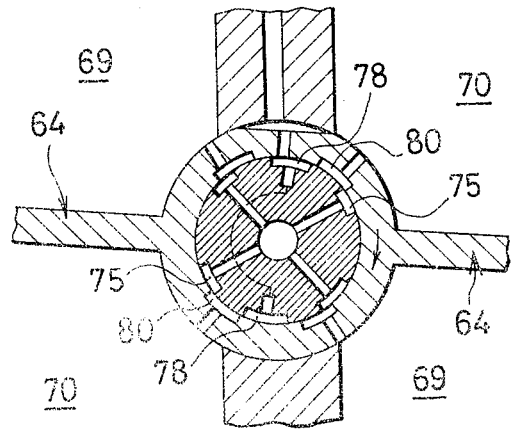
(III)

ASSISTOR FOR TRANSMISSION

This is a continuation of application Ser. No. 141,212 filed Apr. 17, 1980, now abandoned.

BACKGROUND OF THE INVENTION

(1) Field of the Invention

This invention relates to an assistor for operating the transmission of an automotive vehicle, and more specifically to such an assistor which is installed between the gearshift lever and the transmission in such a way that a directional control valve is actuated by the operation of the gearshift lever to supply a fluid to a cylinder and thereby actuate a piston and use the force of its motion as the output with which to move the shift lever and the associated shift jaw of the transmission.

(2) Description of the Prior Art

The development of extensive expressway systems in recent years has led to the introduction of bigger and bigger motor vehicles, naturally with engines of greater capacities and higher outputs than before. Consequently, larger transmissions have been adopted and, to lessen the efforts required by the drivers in operating such transmissions, varied attempts have been made including the provision of some power assistance system, or assistor, between the gearshift lever and the transmission.

Those systems for operating the transmissions of the cab-overs that constitute a large percentage of big trucks have limitations in space, especially in height, for installation. To solve the problem, it is customary that, as typically shown in FIG. 1, the linkage of the gearshift lever is terminated on one side of the transmission so that the operating force applied to the lever opens a valve of the assistor arranged in parallel with the transmission. The force multiplied thereby is taken out as the output to rotate a shift rod extending over and across the transmission and cause a shift lever attached to the rod to actuate the shift jaws of the transmission.

The conventional mechanism for operating the transmission will be described in detail below with reference to FIGS. 1 to 3. FIG. 1 shows an arrangement of the components of the mechanism. The numeral 1 indicates the casing that contains the shift rod and the shift lever and is mounted crosswise on the transmission 2. The casing 3 of the assistor is located on one end of the casing 1, in parallel with the transmission 2. A lever 4 of the assistor, provided on one side of the casing 3, is connected with the gearshift lever 5 below the driver's seat by linkage. In FIG. 1, 6 is a selector lever, and 7 is the clutch.

FIG. 2 is a sectional view, on an enlarged scale, taken on the line A—A of FIG. 1. The above-mentioned lever 4 (hereinafter referred to as the first shifter lever) is integrally coupled to a second shifter lever 9 engaged on the input side of the assistor 8 and is made turnable with respect to the casing 3.

The shift rod 10 is rotatsbly held by the casing 1, with one end extended into the casing 2. Onto this end portion is fixedly mounted a third shifter lever 11 engaged on the output side of the assistor. The shift rod 10 has splines 12 formed on an intermediate portion on which a shift lever or actuator 13 is fitted. In FIG. 2, 14 is a select lever integrally joined to the selector lever 6 of FIG. 1, and 15 is a shift jaw assembly of the transmission 2, comprising three shift jaws or elements $15_1$, $15_2$, $15_3$ meshed with the respective gears of the transmission (not shown).

FIG. 3, a sectional view taken on the line B—B of FIG. 2, illustrates the construction of the assistor 8. The assistor includes a cylinder 16 formed in its casing 3. A hollow piston rod 17 is slidably housed in the cylinder 16, and its piston 18 divides the space in the cylinder 16 into two pressure chambers 19, 20.

An actuating rod 21 is slidably fitted in the bore of the piston rod 17. The actuating rod 21 holds a length of pipe 22 on its end. The pipe 22 has an axial passage 23 for compressed air and also ports 24 to communicate one end of the passage with the bore of the piston rod 17.

In the bore of the piston rod 17, there are a pair of floating valves 25 and 26 held apart, on both sides of the ports 24, stationary valve seats 27, 28 located on the outer sides of the valves and fixedly mounted on the piston rod 17, and valve lifters 29, 30 located on the farther outer sides of the valve seats to actuate the floating valves 25, 26.

The floating valves 25, 26 are biased away from each other and kept in contact with the stationary valve seats 27, 28 by a spring 31 disposed in between. Additional springs 32, 33 are interposed between the valve seats 27, 28 and valve lifters 29, 30 to bias the valve lifters outwardly from each other so that their outer ends are abutted, respectively, against a flange 34 of the pipe 22 and an end 35 of the actuating rod 21.

In the same figure: 36 is a port for supplying compressed air; 37 is a chamber formed by the floating valve seats 25, 26 in the bore of the piston rod 17; 38, 39 are air passages establishing communication between the bore of the piston rod 17 and the chambers 19, 20 of the cylinder 16; 40, 41 are exhaust passages formed between the pipe 22 and the valve lifters 29, 30; 42 is an exhaust passage formed in the piston rod 17; 43, 44 are exhaust passages formed in the actuating rod 21; 45 is an exhaust hole formed in a cover 46; and 47 is a detent mechanism keeping the piston rod 17 and the actuating rod 21 engaged.

The detent mechanism 47 is of the construction now to be described. It includes a hollow arm 48 fixedly secured to the piston rod 17, with a large-diameter chamber 49 formed in the bore of the arm 48. A ball 50 is loosely fitted in the chamber and biased by a spring 51 toward the control rod 21. On the other hand, the actuating rod 21 is provided with protrusions 52, 53 perpendicular to its axis on the opposite sides, and the protrusion 52 has an annular recess 54 at the outer end, so that the ball 50 fits in the recess 54 to keep the piston rod 17 and the actuating rod 21 engaged.

The assistor 8 built in this manner holds the protrusion 53 of the actuating rod 21 engaged with the second shifter lever 9, and holds the arm 48 of the piston rod 17 engaged with the third shifter lever 11.

The conventional mechanism for operating the transmission as so far described operates in the following way. As the gearshift lever 5 shown in FIG. 1 is manipulated for selection, the force is transmitted so as to turn the selector lever 6 and therefore move the select lever 14 in FIG. 2 that is directly connected to the lever 6 leftwardly or rightwardly as viewed in the same figure. Accordingly, the shift lever 13 is moved leftwardly or rightwardly along the splines 12 until it engages the shift jaw $15_1$, $15_2$, $15_3$ of the transmission 2. Next, the gearshift lever 5 is moved for shifting, and the force is transmitted so as to turn the first shifter lever 4 and the second shifter lever 9 directly connnected to the lever 4, thereby moving the actuating rod 21, through the protrusion 53, leftwardly or rightwardly as viewed in FIG. 3.

If, for example, the actuating rod 21 is forced rightwardly, the pipe 22 secured to the rod moves to the right, too, with its flange 34 pushing the valve lifter 29 rightwardly. The rightward movement of the valve lifter 29 urges the floating valve 25 rightwardly away from the stationary valve seat 27. The compressed air that has reached the chamber 37 via the supply port 36, passage 23, and port 24, then flows through the space between the floating valve 25 and the stationary valve seat 27 and further through the air passage 38 into the pressure chamber 19 of the cylinder 16, where it forces the piston 18 rightwardly. Inasmuch as the piston 18 is formed in one piece with the piston rod 17, the piston rod moves rightwardly together with the piston, also carrying the arm 48 secured to the rod rightwardly. This rightward movement of the arm is transmitted to the second shifter lever 11, thus causing the shift rod 10 shown in FIG. 2 to rotate. The rotation of the shift rod is accompanied with turning of the shift lever 13 for frontward or rearward movement (as viewed in FIG. 2) of the shift jaw 15.

With the mechanism for operating the transmission, as will be obvious from the foregoing, the force with which the gearshift lever 5 is operated need not be great but just enough to open the valve. The open valve permits compressed air to act on the piston 18 for the multiplication of force, and the resulting output in turn causes the shift rod 10 to rotate and thereby actuate the shift jaw 15 through the shift lever 13.

Following the conclusion of the shifting procedure for the assistor 8, release of the operating force off the gearshift lever brings the piston rod 17 and the actuating rod 21 to points slightly to the right of the casing 3 as viewed in FIG. 3, but the piston rod 17 and the actuating rod 21 resume their relative position shown in FIG. 3. This allows compressed air to leave the cylinder 19 by way of the air passages 38 and outlet passages 40, 42 to the outside.

As described above, the conventional mechanism for operating the transmission converts the turning motion of the first shifter lever 4 first into a straight line motion by means of the assistor 8 and then reconverts the multiplied output of the straight line motion into a rotational motion of the shift rod 10. Such an operating mechanism produces loss of motion in transmission. Moreover, the ordinary assistor 8 is rather complex in construction and large in size.

SUMMARY OF THE INVENTION

It is an object of the present invention to provide an assistor for operating a transmission so as to enhance the transmitting efficiency of the operating mechanism for the transmission.

Another object of the invention is to provide an assistor for operating a transmission, which is simple in construction, extremely high in mechanical efficiency, and reducible in size.

BRIEF DESCRIPTION OF THE DRAWINGS

FIG. 3 is an enlarged sectional view taken on the line B—B of FIG. 2, showing an assistor of the prior art;

FIG. 4 is a sectional view similar to FIG. 2 but showing an assistor according to this invention;

FIGS. 9(I) to 9(IV) are sectional views illustrating the sequential operation of the ass''tor.

DETAIL OF THE INVENTION

Figure 1:
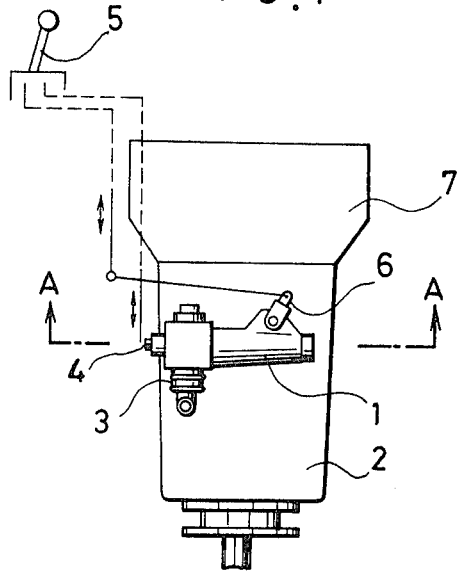
FIG. 1 is a schematic plan view of a conventional mechanism for operating a transmission, illustrating a general layout thereof.
Figure 2:
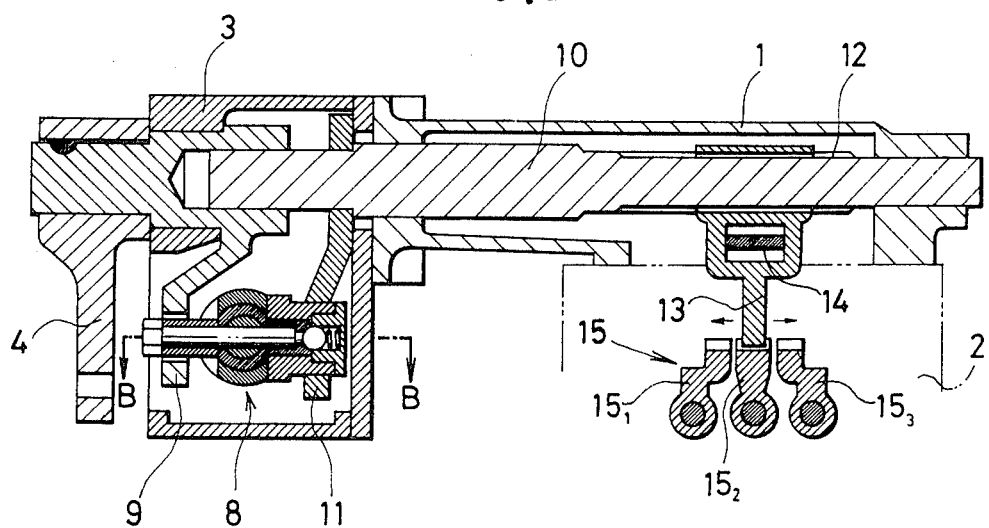
FIG. 2 is a sectional view, on an enlarged scale, taken on the line A—A of FIG. 1.
Figure 5:
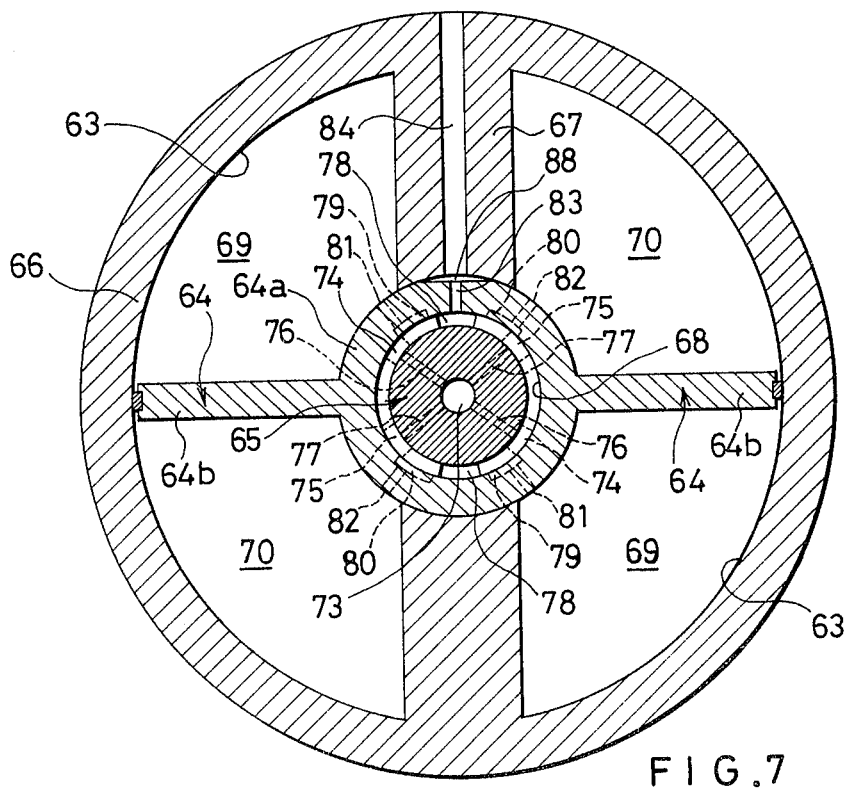
FIG. 5 is an enlarged sectional view taken on the line C—C of FIG. 4.

The present invention will be described in detail below in conjunction with the drawings showing embodiments thereof. FIG. 4 is a sectional view of the assistor 61 according to the invention, as incorporated between a first shifter lever 4 and a shift rod 10 both of which are similar to those of the prior art. FIG. 5 is an enlarged sectional view taken on the line C—C of FIG. 4.

As shown in FIGS. 4 and 5, the assistor 61 of the invention comprises cylinders 63 formed in a casing 62, pistons 64 adapted to revolve slidably within the cylinders, and a fluid system including a directional control valve 65 whereby compressed air is supplied to, and discharged from, the cylinders 63. The cylinders 63 consist of arcuate walls 66 of the casing 62 and a straight wall 67 partitioning the cylindrical space into two, each of a semicylindrical contour. The pistons 64 consist of a common boss 64a and vanes 64b so formed as to extend radially from the periphery of the boss. The boss 64a is revolvably fitted in and supported by a center opening formed in the straight wall 67 of the casing 62, and the boss 64a itself has an axial hole 68 in the center. The vanes 64b, formed in one piece with the boss and extended radially therefrom, are turnable in sliding contact with the arcuate inner wall surfaces of the cylinders 63, each vane thus dividing the semicylindrical space into a set of pressure chambers 69, 70. The boss 64a extends at one end beyond the casing 62 and forms a flange 71, which is splined to one end of the shift rod 10.

Figure 6:
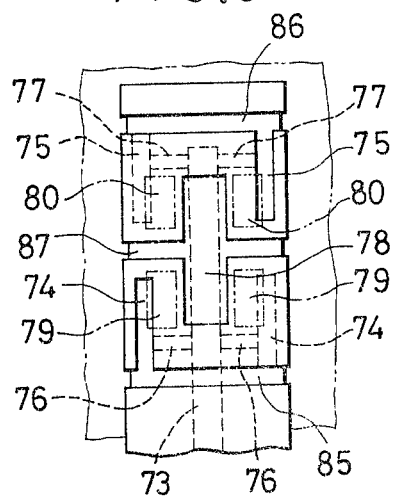
FIG. 6 is a plan view of the essential portion of a directional control valve.
Figure 7:
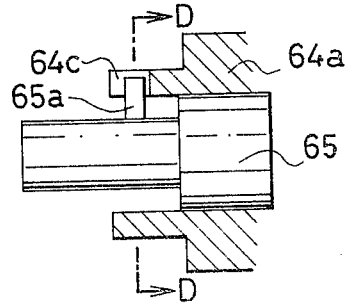
FIG. 7 is a view of a device for arresting relative rotational displacement.
Figure 8:
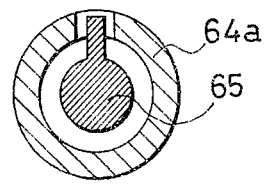
FIG. 8 is a sectional view taken on the line D—D of FIG. 7.

The directional control valve 65 is turnably held in the axial hole 68, with its stem 72 fixedly fitted in a through hole formed in the first shifter lever 4. The fluid system for supplying compressed air to, and discharging it from, the pressure chambers 69, 70 of the cylinders 63 is built as follows. The directional control valve 65 has an exhaust passage 73 forming an axial bore, exhaust grooves 74, 75 on the peripheral surface, and exhaust passages 76, 77 establishing communication between the exhaust passage 73 and the grooves 74, 75. In addition, a supply groove 78 is formed on the periphery. The pistons 64, on the other hand, are formed with combined supply-exhaust grooves 79, 80 axially of their bore 68, and formed with passages 81, 82 communicating those grooves with the chambers 69, 70 of the cylinders 30. Additionally, a suppy passage 83 is formed radially through the common boss of the pistons. The straight wall 67 of the casing 62 is provided with a supply passage 84 connecting the supply passage 83 with a fluid pressure source (not shown). On the periphery of the directional control valve 65, as shown in FIG. 6, there are formed arcuate grooves 85, 86, 87, which establish communication between the grooves 74 and 74, 75 and 75, and 78 and 78. A recess 88 formed in common with the pistons 64 maintains communication between the passages 83 and 84 when the pistons 64 swing. As indicated in FIGS. 7 and 8, the common boss 64a of the pistons 64 has an axial slit 64c and the directional control valve 65 has a radial protuberance 65a kept within the slit 64c so that, when a displacement beyond a predetermined range of relative rotational displacement occurs between the boss 64a of the pistons 64 and the directional control valve 65, the pistons and valve can turn together.

The operation of the assistor 61 will now be explained in connection with FIGS. 9(I) to 9(IV). Throughout these figures, by way of simplification, the grooves and passages are all shown in one and the same cross section, and the arcuate groove 87 communicating the supply grooves 78, 78 with each other is indicated by a broken line.

FIG. 9(I) shows the assistor in the inoperative state, with supply of fluid from a pressure source (not shown), through the supply passages 84 of the casing 62, the recess 88 of the pistons 64, and the supply passages 83, led to, and shut off by, the supply grooves 78 of the directional control valve 65. The exhaust passage 73 of the directional control valve 65 is communicated with the chambers 69, 70 of the cylinders 63 via the radially extended exhaust passages 76, 77, exhaust grooves 74, 75, and grooves 79, 80 and passages 81, 82 of the pistons 64. Thus, the pistons 64 are under no load, and there is no assisting action, or no multiplication of the working force being performed.

Figure 9:
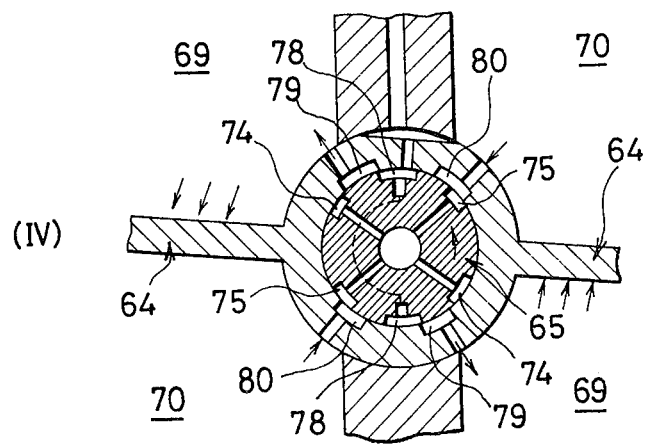

When the directional control valve 65 is turned clockwise as in FIG. 9(II), it cuts off the communication between the exhaust grooves 75 of the valve 65 and the grooves 80 of the pistons 64, while keeping the supply grooves 78 of the valve 6 and the grooves 80 of the pistons 64 communicated. On the other hand, the exhaust grooves 74 of the valve 65 and the grooves 79 of the pistons 64 remain in communication, and therefore the fluid in the pressure chambers 69 is discharged. The fluid then enters the pressure chambers 70, where it acts on the vanes 64b of the pistons 64, thus turning the pistons clockwise. This turning force is transmitted through the flange 71 shown in FIG. 4 to the shift rod 10 so as to actuate the shift lever 13.

The clockwise turning of the pistons 64 through a predetermined angle to the position in FIG. 9(III) brings the directional control valve 65 and the pistons 64 to the same relative position as in FIG. 9(I). That is, the communication between the supply grooves 78 of the valve 65 and the grooves 80 of the pistons 64 is cut off, whereas the exhaust grooves 75 of the valve and the grooves 80 of the pistons are communicated. Hence the pistons 64 are again freed of load and stop in that position.

When the directional control valve 65 is turned counterclockwise as shown in FIG. 9(IV) to the original position in FIG. 9(I), the supply grooves 78 of the valve 65 are communicated with the grooves 79 of the pistons 64 and the communication of the latter with the exhaust grooves 74 of the valve 65 is cut off. The exhaust grooves 75 of the valve 65 and the grooves 80 of the pistons 64 remain engaged. Consequently, the fluid is supplied to the pressure chambers 69 so as to act on the vanes 64b of the pistons 64 and force the pistons counterclockwise. The pistons 64, having turned to the state shown in FIG. 9(I), stop there in the manner as already stated. This turning motion of the pistons 64 is directly transmitted through the flange 71 to the shift rod 10, thereby actuating the shift lever 13 and resetting the shift jaw 15 to the neutral position.

Figure 10:
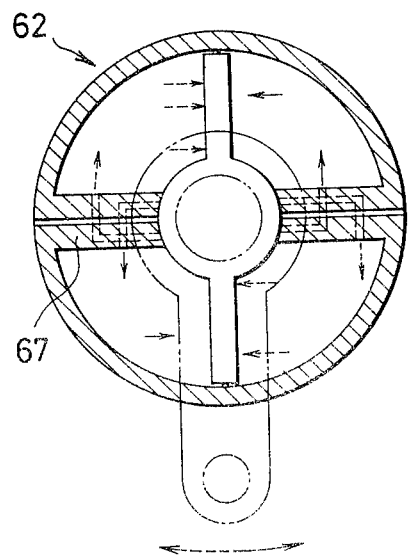
FIGS. 10 and 11 are sectional views of other embodiments of the invention.
Figure 11:
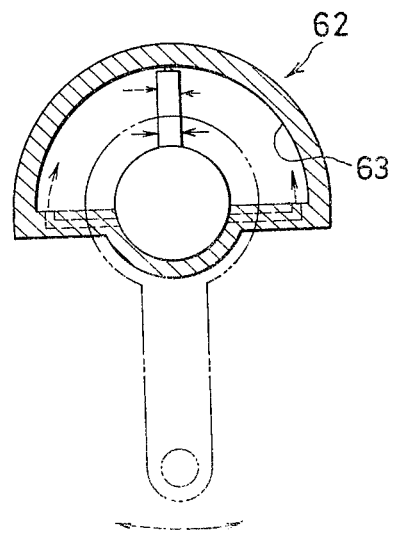

Although the embodiment so far described uses a fluid system having the supply-exhaust grooves 79, 80 and supply-exhaust passages 81, 82 all formed in the pistons 64, those grooves and passages may be formed instead in the straight wall 67 of the casing 62 as shown in FIG. 10. Also, while the embodiment has two cylinders 63 formed symmetrically in the cylindrical casing 62, it is possible alternatively to provide a single cylinder 63 in a semicylindrical casing 62 as in FIG. 11.

The mechanism for operating a transmission incorporating such an assistor 61 is manipulated in the following way. After a selecting motion in the usual manner, the driver operates the gearshift lever 5 for a shifting motion. The operating force is transmitted through linkage to the first shifter lever 4 to turn the same. With the turning of the first shifter lever 4, the directional control valve 65 of the assistor 61 integrally connected to the lever is turned, too, permitting the assistor to achieve the multiplication of force as already described. The force thus multiplied and obtained as the rotational output is transmitted through the common flange 71 of the pistons 64 to the shift rod 10, thus actuating the shift lever 13 and therefore the shift jaw 15 of the transmission.

As has been described hereinbefore, the transmission-operating assistor according to the invention is capable of obtaining a rotational output multiplied by means of a revolving piston or pistons, and the piston stem or boss can be directly coupled to the shaft rod. This improves the motion-transmitting efficiency of the transmission-operating mechanism and makes possible simplification in construction and reduction in size of the assistor.

What is claimed is:

1. An assistor for a power assisted shifting of a vehicle transmission using a manually movable gear shift lever (5) comprising:

a housing (62) having a central axis;

a shift rod (10) rotatably mounted about said axis in said housing having an actuator (13) for moving one shift element (15) of a plurality of elements (15₁,15₂,15₃), with rotation of said shift rod to shift the transmission;

a selection lever (6) engaged with said actuator (13) and connected by linkages to said gear shift lever (5), said selection lever pivotally mounted to said housing and movable by movement of said gear shift lever to move said actuator (13) to one of said shift elements;

a power cylinder (63) connected to said housing having an arcuate wall portion (66) and a straight wall portion (67) defining a space with an arcuate surface having a center of curvature at said axis;

a piston (64) having a boss (64b) rotatably mounted in said cylinder about said axis and connected to said rod, said piston having at least one vane (64b) extending radially into said space and toward said arcuate surface to divide said space into two pressure chambers (69, 70);

a directional valve for receiving a pressure fluid and having a rotatable stem (65) for supplying the pressure fluid selectively to one or the other of said two pressure chambers with rotation of said stem, said stem being rotatably mounted in said piston boss and about said axis;

means connecting said stem (65) to the gear shift lever (5) for moving said stem to selectively supply pressure fluid to one of said two pressure chambers to rotate said piston and connected shift rod, said means comprising a shift lever (4) fixed to said stem (65) and a linkage connected between said shift lever and the gear shift lever; and relative rotation limiting means connected between said stem and said piston boss for permitting limited relative rotation between said stem and said piston boss before co-rotation of said piston boss and said shift lever, said limited relative rotation being sufficient to rotate said stem into a position for supplying the pressure fluid to one of the pressure chambers, said rotation limiting means comprising a slot in said piston boss and a projection extending from said stem into said slot having a width less than that of said slot;

a pressure fluid passage being defined in said straight wall portion, said piston boss defining a central chamber for rotatably receiving said stem, said boss having a passage communicating said straight wall portion passage with said central chamber at all angular positions of said piston, said boss including ports communicating said central chamber with each of said two pressure chambers, said stem including passages defined on an outer surface thereof for selectively opening one of said ports at a time with relative rotation between said stem and said piston boss, to communicate said straight wall portion passage with one of said two pressure chambers.

* * * * *